United States Patent

[11] 3,617,975

| [72] | Inventor | Harry H. Wieder<br>Riverside, Calif. |
|---|---|---|
| [21] | Appl. No. | 865,708 |
| [22] | Filed | Oct. 13, 1969 |
| [45] | Patented | Nov. 2, 1971 |
| [73] | Assignee | The United States of America as represented by the Secretary of the Navy |

[54] TWO-LAYER MAGNETORESISTORS
9 Claims, 3 Drawing Figs.

[52] U.S. Cl. .................................................... 338/32, 317/235 M
[51] Int. Cl. ........................................................ H01c 7/16
[50] Field of Search ........................................... 338/32, 32 H

[56] References Cited
OTHER REFERENCES

H. H. Wieder, " Anomalous Transverse Magnetoresistance of InsB Films," J. Appl. Phys. 40, 3320 (1969) Scientific Library Call No. QC1J82

Primary Examiner—Rodney D. Bennett, Jr.
Assistant Examiner—R. Kinberg
Attorneys—R. S. Sciascia and J. M. St. Amand ABSTRACT: Thin film and bulk magnetoresistors having sensitivity improved by a factor greater than two by coating the magnetoresistor element with a thin conductive layer which short circuits the Hall effect in the semiconducting material.

HARRY H. WIEDER
INVENTOR.

BY
ATTORNEY

TWO-LAYER MAGNETORESISTORS

The invention herein described may be manufactured and used by or for the government of the United States of America for governmental purposes without the payment of any royalties thereon or therefor.

The purpose of this invention is to increase the change in the resistance of magnetoresistors brought about by a magnetic field. Defining the zero field resistance as $R_o$ and the resistance in a given transverse magnetic field $H$ as $R(H)$, then $R(H)/\text{A}_{Y_o}-1=\Delta R/R_o$.

Such magnetoresistor elements are important as transducers for converting mechanical displacement, either linear or angular, into a proportional electric signal. They are also of importance for monitoring or controlling rotating electric machines, for translating an AC into a DC signal without benefit of PN-junctions and for analog computation such as multiplication and division.

At room temperature, in magnetic fields smaller than 10 kOe, indium antimonide bulk material doped with electron donor impurities, of about $10^{16}$cm.[13], has a negligibly small $(\Delta R/R_o)$. In the intrinsic range, i.e., if acceptor impurities are introduced into InSb then a magnetoresistance component of "physical" origin, $(\Delta R/R_o)_p$ appears as a consequence of the conduction process in which both electrons and holes participate. Such a two-band conduction process produces a "physical" magnetoresistance as shown theoretically and experimentally, for example, by R. A. Smith "Semiconductors", Cambridge University Press (1959).

In addition to the "physical" magnetoresistance there is also a stronger "geometrical" magnetoresistance $(\Delta R/R_o)_G$. Such a magnetoresistance is brought about by the circuital or electrostatic short circuit of the transverse Hall field induced in an InSb bulk or film specimen by a transverse magnetic field. A rectangular device with a small length to width ratio, length being measured in the direction of the current flow ($H=0$), produces a large $(\Delta R/R_o)_G$. A Corbino disc, such as shown and described in "Anomalous Transverse Magnetoresistance of InSb Films" by H. H. Wielder, J. Appl. Phys. 40, 3320 (1969) is such a device. In general, the total magnetoresistance is the sum of the geometrical and physical magnetoresistance components and can be expressed approximately as: $(\Delta R/R_o)_t = (\Delta R/R_o)_G + (\Delta R/R_o)_P$.

This invention is concerned with a method of increasing $(\Delta R/R_o)_P$ above that normally present in films such as InSb and to do this by a process and technique which is superior to that of doping the film with acceptor impurities. The disadvantage of doping the film with acceptor impurities is that it introduces a strong undesirable temperature dependence in addition to the already present temperature sensitivity of an InSb magnetoresistor. Furthermore, in order to obtain it, the doping procedure must lead to an electron concentration of $5\times10^{15}$cm.[13] and a hole concentration of $5\times10^{16}$cm.[13] a procedure which has not been attained with indium antimonide films which have electron concentrations in excess of $10^{16}$cm.[13] even without deliberate doping. The above-described doping levels are necessary in order to obtain the maximum $(\Delta R/R_o)_P'$ of about 1.2 in a field $H=10$ kOe, as shown by H. Rupprecht, R. Weber and H. Weiss in Zeitschrift fur Naturforsch. 15a, 783 (1960) and also by C. Hilsum and R. B. Barrie in Proc. Phys. Soc. (London) 71, 676 (1958).

Other objects and many of the attendant advantages of this invention will become readily appreciated as the same becomes better understood by reference to the following detailed description when considered in connection with the accompanying drawings wherein.

The theoretical development, in the aforementioned article "Anomolous Transverse Magnetoresistance of InSb Films" by H. H. Wieder, shows that if a low mobility surface layer is present on indium antimonide films in which the hole concentration is negligibly small, then a physical magnetoresistance component arises in consequence of this surface layer. The physical magnetoresistance already present in the film is shown to be and to behave in good agreement with the features of the theoretical model.

In particular, it is shown that if the sheet conductivity, $\sigma_A = \sigma_b d_b$, where $d_b$ is the portion of the film thickness in which the bulklike InSb conductivity $\sigma_b$ prevails, and $\sigma_B$ is the sheet conductivity of the surface layer where the effective conductivity is $\sigma_s$ and whose thickness is $d_s$ (i.e. $\sigma_B = \sigma_s d_s$), then the effective physical magnetoresistance is $$\left(\frac{\Delta \rho}{\rho_o}\right)_p = \frac{g\mu^2 H^2}{(1+g)^2 + \mu^2 H^2} \quad (1a)$$

where $\mu$ is mobility of the portion of the film with bulklike properties and $g$ is the ratio of the sheet conductivities:

$$\frac{\sigma_A}{\sigma_B} = \frac{\sigma_b d_b}{\sigma_s d_s} \quad (2a)$$

The aforementioned article by H. H. Wieder shows that the surface layer already present on the InSb film leads to an effective value of $g=33.33$.

The question was whether it was possible to add an additional surface layer so as to obtain the optimum or the maximum magnetoresistance in terms of equation (1a). It has been found that if a surface layer is added in which electronic conduction is dominant and the mobility of the electrons is low in comparison with $\mu$ then it can simply be combined to form a new value of $\sigma_B = \sigma_s d_s + \sigma_s' d_s'$ where $\sigma_s' d_s'$ is the respective sheet conductivity of the additional layer.

In order to determine the optimum value of $g$ for maximum $(\Delta R/R_o)_P$ take the derivative with respect to $g$ of equation (1a):

$$\frac{d(\Delta R/R_o)_P}{dg} = \frac{\mu^2 H^2}{(1+g)^2 + \mu^2 H^2} - \frac{2(Hg)g\mu^2 H^2}{[(Hg)^2 + \mu^2 H^2]^2} = 0 \quad (3a)$$

Solving for optimum value $g_o$:

$$g_o = (1+\mu^2 H^2)^{1/2} \quad (4a)$$

Evidently for $H=0$, $g_o=1$ and for $\mu=6\times10^4$cm.$^2$/Vs, $H=3\times10^3$ $0_e$, from eq. (4a), $g_o=2.06$.

This shows that adding a conductive layer to the InSb film so as to decrease $g$ from about 33 to about 2 will increase the effective magnetoresistance of an InSb film.

Figure 3:
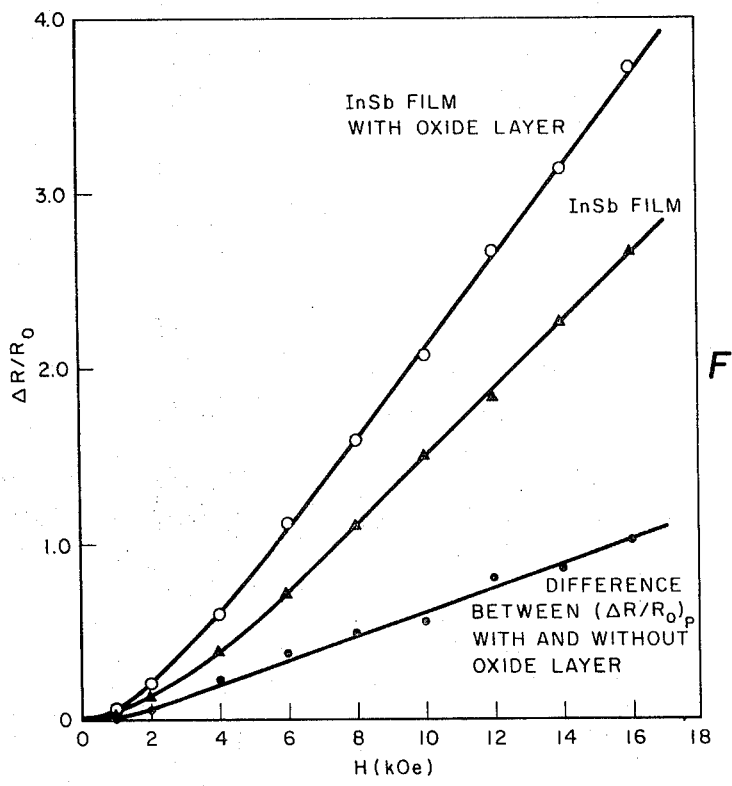
FIG. 3 is a graph showing the difference between $\Delta R/R_o$ with and without an oxide layer.

Indium oxide ($In_2O_3$) has been found to be a suitable material for providing the covering layer for the InSb film. $In_2O_3$ has an electron mobility of the order of $10^2$cm.$^2$/Vs at room temperature and a concentration of about $10^{18}$ electrons/cm.$^3$; however, the technique per se is not restricted to indium antimonide films nor specific to $In_2O_3$. This method is also applicable to other semiconductor and semimetal films. An increase of 25 percent more in the effective magnetoresistance of films with suitable covering layer is feasible, affording more sensitive magnetoresistance transducers. FIG. 3 of the drawing is for a representative specimen. The curve $(\Delta R/R_o)$ vs $H$ marked "InSb Film" is that obtained on the film prior to overcoating with $In_2O_3$.

Figure 1:
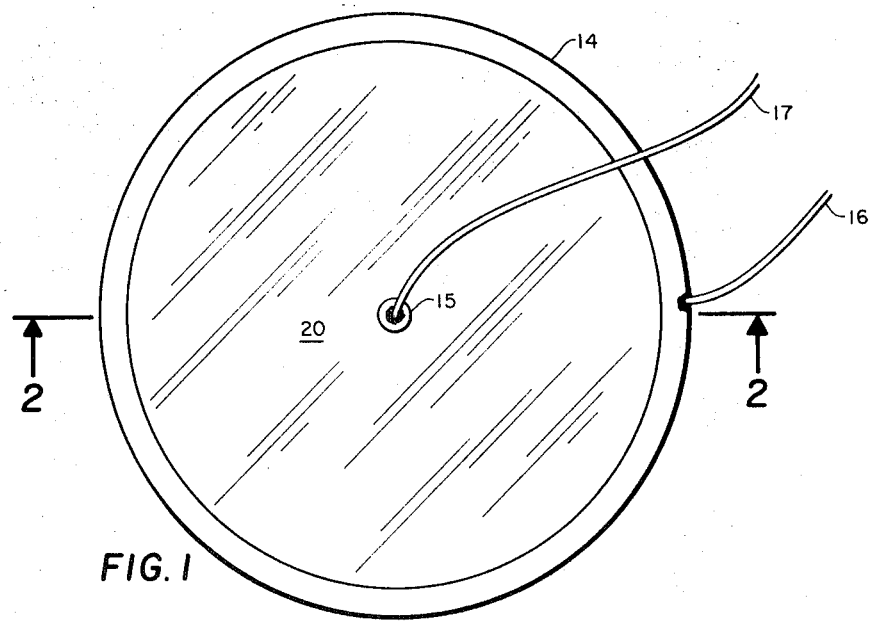
FIG. 1 is a plan view of the Corbino disc-type magnetoresistor of the present invention.
Figure 2:
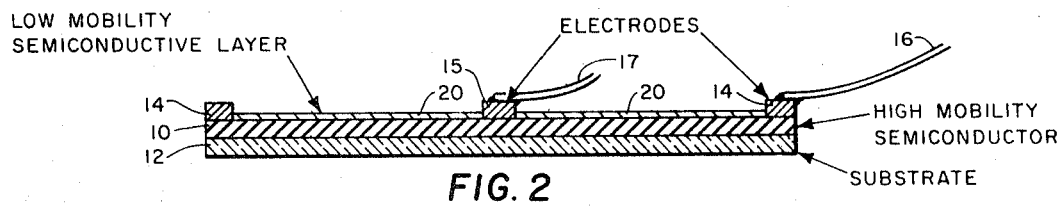
FIG. 2 is a cross-sectional view of the Corbino disc-type magnetoresistor of the present invention.

InSb films vacuum deposited on glass substrates and recrystallized either by radiant heating or by electron beam microzone synthesis were used in the construction of Corbino disc magnetoresistors. All the films were polycrystalline and those recrystallized by radiant heating had randomly oriented dendritic structure. The zone-recrystallized films consisted of only a few large size crystallites having mobilities of the order of, or greater than $5.5\times10^4$cm.$^2$/Vs at room temperature. The dendritic films, on the other hand, had mobilities of the order of $4\times10^4$cm.$^2$/Vs. FIGS. 1 and 2 show a Corbino disc-type magnetoresistor of the present invention. The high mobility semiconductor films 10, including their glass substrates 12, were cut, by means of an ultrasonically driven tool, into circular discs. Concentric copper electrodes 14 and 15 were applied to the discs by standard photolithographic techniques. "Photoresist" was used to mask all except the desired portion of a disc, a ring on its periphery and a circular spot at its center. Copper was electroplated on the exposed portions. Leads 16 and 17 were then attached to the electrodes by means of conductive epoxy cement. InSb, InAs, or semimetal bismuth can be used as the high mobility semiconductor base 10. The thin low mobility semiconductive layer 20 can consist of $In_2O_3$, ZnO, CdO or $Bi_2O_3$ and can be formed on the surface of the high mobility semiconductor base 10 by evaporative or sputter process of In, Zn, Cd or Bi in a reactive environment. Other magnetoresistor structures equivalent to a Corbino disc-type structure using this invention can also be produced, such as "InSb Film Raster Pattern Magnetoresistors" by H. H. Wieder and D. A. Collins, Solid State Electronics, Vol. 11, 1093 (1968). The dimensions of the rectangular film specimen were: $l$=0.51 cm., $w$=0.23 cm. and thickness $d$=2.2 $\mu$m. The geometrical magnetoresistance component of this film specimen was moderate. At 5kOe it is $(\Delta R/R_o)_G$=0.2 and at 10 kOe, $(\Delta R/R_o)_G \cong 0.6$. Thus the major portion of the curve shown in FIG. 3 is of "physical" origin.

The curve $(\Delta R/R_o)$ vs $H$ indicated "InSb Film with Oxide Layer" was measured on the same film after it was overcoated with a 560A thick $In_2O_3$ layer covering the entire film area except for the previously attached electrodes. The mobility of the oxide layer was determined as 36 cm.$^2$/Vs. An evaluation of the effective value of g was obtained as $$g \cong 3.5 \qquad (5a)$$

The last curve on FIG. 3 shows the difference between the other two curves and represents the increase in the effective measured value of the total magnetoresistance gained by overcoating with the $In_2O_3$.

This invention provides a substantial magnetoresistive component which is not dependent on a specific geometry such as those of raster patterns, Corbino discs or metallic inclusions; there is no need to dope the InSb hence to increase the temperature dependence of the material or decrease its mobility due to impurity scattering. A specific low mobility material can be chosen for overcoating the high mobility semiconductor film such that it will match the electrical characteristics of the film proper over a wide temperature region and also match its thermal expansion characteristic. The low mobility covering material, such as in the case of $In_2O_3$, also serves as a protective coating to prevent oxidation of the high mobility semiconductor film surface.

What is claimed is:
1. A magnetoresistor having an increased magnetoresistance component over that normally present comprising:
   a. a semiconductor base of material having high electron mobility,
   b. a pair of electrodes attached to said base,
   c. a semiconductor coating of material having low electron mobility formed on the surface of said semiconductor base,
   d. said semiconductor coating having low electron mobility producing an increase in effective physical magnetoresistance of the magnetoresistor.
2. A magnetoresistor as in claim 1 wherein said semiconductor base of material having high electron mobility consists of InSb.
3. A magnetoresistor as in claim 1 wherein said semiconductor base of material having high electron mobility consists of InAs.
4. A magnetoresistor as in claim 1 wherein said semiconductor base of material having high electron mobility consists of semimetal bismuth.
5. A magnetoresistor as in claim 1 wherein said semiconductor coating of material having low electron mobility consists of $In_2O_3$.
6. A magnetoresistor as in claim 1 wherein said semiconductor coating of material having low electron mobility consists of ZnO.
7. A magnetoresistor as in claim 1 wherein said semiconductor coating of material having low electron mobility consists of CdO.
8. A magnetoresistor as in claim 1 wherein said semiconductor coating of material having low electron mobility consists of $Bi_2O_3$.
9. A magnetoresistor as in claim 1 wherein said semiconductor coating of material having low electron mobility also provides a protective coating which prevents oxidation of the semiconductor base which has a high electron mobility.

* * * * *